(12) United States Patent
Desai et al.

(10) Patent No.: US 12,298,866 B2
(45) Date of Patent: May 13, 2025

(54) MANAGING RESTORE WORKLOADS USING A HAZARD FUNCTION

(71) Applicant: Dell Products L.P., Round Rock, TX (US)

(72) Inventors: Keyur B. Desai, Cary, NC (US); Dominick J. Santangelo, Raleigh, NC (US); Divya Chukkapalli, Durham, NC (US)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 18/296,735

(22) Filed: Apr. 6, 2023

(65) Prior Publication Data

US 2023/0244575 A1 Aug. 3, 2023

Related U.S. Application Data

(63) Continuation-in-part of application No. 17/101,326, filed on Nov. 23, 2020, now Pat. No. 11,630,743.

(51) Int. Cl.
*G06F 11/14* (2006.01)
*G06F 11/07* (2006.01)

(52) U.S. Cl.
CPC ........ *G06F 11/1469* (2013.01); *G06F 11/076* (2013.01)

(58) Field of Classification Search
CPC ........................... G06F 11/1469; G06F 11/076
See application file for complete search history.

(56) References Cited

U.S. PATENT DOCUMENTS

| | | |
|---|---|---|
| 8,312,181 B1 | 11/2012 | Faith et al. |
| 10,592,351 B1 | 3/2020 | Desai |
| 2004/0268051 A1 | 12/2004 | Berg et al. |
| 2010/0108502 A1 | 5/2010 | Inoue et al. |
| 2019/0147364 A1* | 5/2019 | Alt .......................... G06N 7/01 706/12 |

* cited by examiner

*Primary Examiner* — Baboucarr Faal
(74) *Attorney, Agent, or Firm* — Workman Nydegger

(57) ABSTRACT

One example method includes determining a hazard value such as a Weibull hazard function value for an operation such as a recovery operation. Enablement and disablement of a read ahead cache are performed based on the hazard value. The hazard value is representative of whether accesses to a file, such as a backup, being recovered or read are sequential or random. The read ahead cache is enabled when the accesses are sequential or sufficiently sequential.

20 Claims, 10 Drawing Sheets

MANAGING RESTORE WORKLOADS USING A HAZARD FUNCTION

RELATED APPLICATION

This application is a continuation-in-part of U.S. Ser. No. 17/101,326 filed Nov. 23, 2020, which application is incorporated by reference in its entirety.

FIELD OF THE INVENTION

Embodiments of the present invention generally relate to data protection and data protection operations. More particularly, at least some embodiments of the invention relate to systems, hardware, software, computer-readable media, and methods for managing data protection workloads including hazard function based restore operations.

BACKGROUND

Data protection systems, which generally perform backup operations and restore operations, are a critical aspect of computing systems today. The loss of data can have a catastrophic impact on an entity. While the need to protect data is widely understood, data protection operations are often burdened by real world limitations. For example, the amount of data being protected can be large. As a result, if there is a need to perform a restore operation, the restore operation may be impacted by the size of the data. As a result, it is beneficial to reduce the amount of time needed to perform the restore operation.

For example, when data is restored, the data being restored is often read in advance and cached. This may work wonderfully when the data that is read in advance turns out to the be data needed by the client. Reading ahead and caching the data, however, can also cause problems. The data that is read in advance and cached may not be the data needed by the restore operation. In addition, reading data from a source such as the cloud can be costly when the cost is based on bytes of data restored or read and the wrong data is read in advance. In other words, reading ahead may cause unnecessary data to be read, which can be costly.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
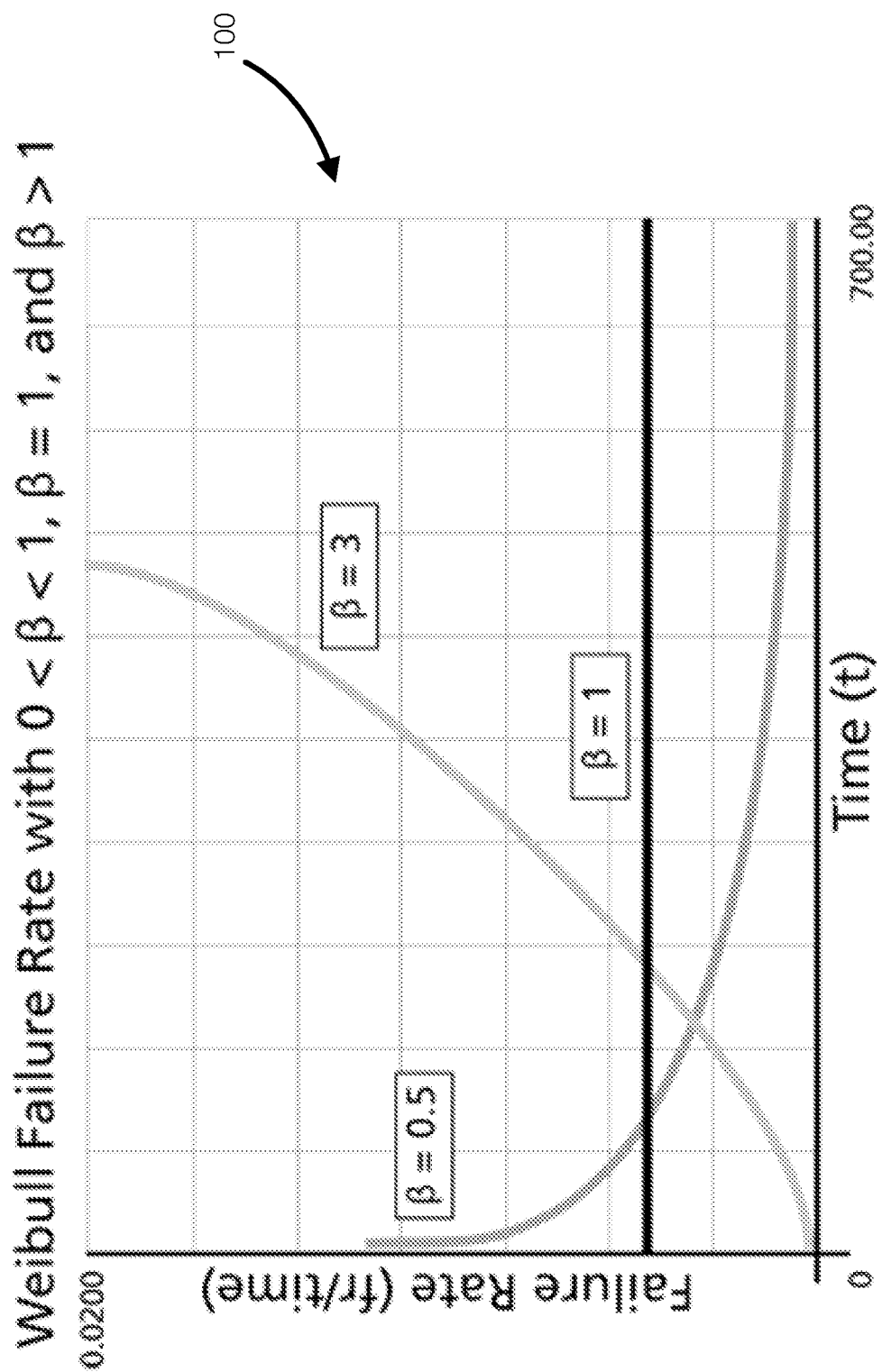
FIG. 1 discloses aspects of a failure rate associated with a Weibull modulus.

Embodiments of the present invention generally relate to data protection operations and processes. More particularly, at least some embodiments of the invention relate to systems, hardware, software, computer-readable media, and methods for performing data protection operations such as restore operations.

Example embodiments of the invention further relate to restore operations that optimize performance related, for example, to reading ahead and caching data being restored. Embodiments of the invention may use restore access patterns to determine whether to enable/disable read ahead caching. The decision may be based on a value of a hazard function that is generated from a subpopulation of accesses.

Restore operations restore data from a backup of some type. In order to restore the backup, it is necessary to read data from the backup and write the data to a destination. When the restore operation (also referred to herein as a restore workload) reads the backup, the data may be read, by way of example only, sequentially or non-sequentially (randomly). Reading ahead and caching that data when the backup is accessed randomly can result in reading data that is not needed and/or in excessive costs. Reading ahead and caching the read ahead data when the backup is accessed sequentially can improve the performance of the restore operation. However, the manner (sequential or non-sequential) in which the backup is accessed is often unknown. Further the access can switch from sequential to non-sequential or from non-sequential to sequential one or more times for the same restore workload. The speed of the restore operation and the cost can be more effectively managed by controlling when the restore operation uses a read ahead cache.

Embodiments of the invention model restore workloads based on, by way of example only and not limitation, a Weibull statistical probability distribution model or hazard function. Embodiments of the invention enable/disable a read ahead cache based on the model or based on a shape parameter or modulus (e.g., a Weibull shape parameter or modulus) or based on the Weibull hazard function or a Weibull failure rate.

In an engineered system, a failure rate is a frequency at which the engineered system fails. The failure rate may be expressed as per unit of time. Standard parameterization of the Weibull distribution defines a shape parameter that relates directly to the failure rate of the engineered system. For example, a Weibull analysis is a method used to perform analysis on life data (e.g., product life data).

Many products have a warranty period and, in many cases, the consumer is encouraged to purchase an extended warranty or protection plan. The terms of these warranties are often based on calculated risks of failure. A life data analysis, such as a Weibull analysis, can help estimate the risk of product or component failure, and allows the warranty costs and time periods to be better estimated.

Embodiments of the invention adapt this type of distribution to a restore operation and more specifically to caching in a restore operation. In embodiments of the invention, a sequential access pattern is deemed a success and a random access pattern is deemed a failure. More specifically, if the number of times a restore access pattern is sequential is deemed a success and the number of times the restore access pattern becomes non-sequential is deemed as failure, the failure rate can be modelled and can be used to determine when to enable/disable the read ahead cache. More specifically, accesses to data being read can be tracked. By way of example only, when an access is sequential with respect to a previous access (e.g., most recent access), the access is a success. If the access is non-sequential with respect to a previous access (e.g., most recent access), the access is a failure.

The Weibull modulus and the Weibull hazard function both relate to the failure behavior of a population. However, The Weibull modulus typically describes the shape of the distribution of failure times. The Weibull hazard function relates to the failure rate at a particular time.

A distribution such as a Weibull distribution can model a variety of behaviors. Further, other statistical techniques including variance, mean, and standard deviation can be incorporated into the analysis.

For a continuous function, the probability density function (PDF) is the probability that a random variable has a particular value. The Weibull PDF is used to determine the distribution of failures. An example of a 2 parameter Weibull PDF for any given random variable t, is:

$$f(t) = \frac{\beta}{\eta}\left(\frac{t}{\eta}\right)^{\beta-1} e^{-\left(\frac{t}{\eta}\right)^\beta}$$

In this example, $\eta$=a scale parameter and $\beta$=a shape parameter or slope or a Weibull modulus.

FIG. 1 illustrates a graph that shows an example of a failure rate associated with a Weibull modulus. More specifically, the graph 100 illustrates that Weibull distributions where $\beta<1$ have a failure rate that decreases with time. Thus, the failures or the bulk of the failures occur early and are known as infantile or early life failures. When performing restore workloads such as restoring a virtual machine, the restore pattern is often random or non-sequential during the initial stage of the restore workload. The restore pattern of a virtual machine often stabilizes to sequential over the course of the restore operation. Applying a Weibull distribution to a restore operation would initially disable the read ahead cache until or while $\beta<1$ and enable or gradually enable the read ahead cache when the restore pattern stabilizes to sequential (e.g., $\beta=1$ or approximately 1).

Weibull distributions with $\beta$ close to or equal to 1 have a fairly constant failure rate. Embodiments of the invention adapt the failure rate to non-sequential reads such that distributions with $\beta$ close to or equal to 1 to indicate a constant sequential read pattern, with occasional random reads. The failure rates (e.g., random or non-sequential reads) are usually sufficiently constant such that read ahead caching is not affected. Restore access patterns with $\beta$ close to or equal to 1 is a situation where read ahead caching may be enabled.

When $\beta>1$, the failure rate increases with time (e.g., wear out failures). In the context of a restore operation, $\beta>1$ indicates a non-sequential read pattern. With a non-sequential read pattern, read ahead caching is not effective and the recommendation would be to disable the read ahead cache.

As applied to a restore process or workload, $\beta<1$ indicates that the access pattern is initially non-sequential and that the access pattern changes to sequential over time. In this case, the read ahead cache can be gradually enabled over time or enabled for the restore process.

$\beta=1$ suggests a stable sequential access pattern. The read ahead cache may be enabled for the restore process.

$\beta>1$ suggests that the access pattern is more non-sequential over time. Read ahead caching may be disabled in this situation for the restore process.

In the context of a restore operation, the Weibull modulus can be adapted to failures occurring the data access pattern. In the beginning of the restore operation, the modulus may be less than 1 and indicate a non-sequential pattern. As the modulus approaches 1, the read ahead cache would be enabled gradually. When the modulus departs from 1, the read ahead cache can be gradually enabled. In addition, the point at which the read ahead cache is enabled/disabled can be adjusted dynamically and the enablement/disablement of the read ahead cache can also be performed dynamically.

Embodiments of the invention model restore access patterns and embodiments of the invention determine a Weibull modulus from restore access patterns. This helps identify sub-populations for which a read ahead cache may be enabled or for which the read ahead cache is disabled.

A cumulative distribution function (CDF) refers to the probability that a non-sequential variable falls within a specified range (e.g., is greater than or equal to a stated lower limit and less than or equal to a stated upper limit).

In the case of the two parameter Weibull distribution, for a non-sequential variable t, the CDF(Q(t)) is given by:

$$F(t) = Q(t) = 1 - e^{-\left(\frac{t}{\eta}\right)^\beta} \quad \text{equation (1)}$$

This function (1) can be linearized and put in a common form:

$$y = mx + b$$

For example:

$$Q(t) = 1 - e^{-\left(\frac{t}{\eta}\right)^\beta}$$

$$\ln(1 - Q(t)) = \ln\left(e^{-\left(\frac{t}{\eta}\right)^\beta}\right)$$

$$\ln(1 - Q(t)) = -\left(\frac{t}{\eta}\right)^\beta$$

$$\ln(-\ln(1 - Q(t))) = \beta\left(\ln\left(\frac{t}{\eta}\right)\right)$$

$$\ln\left(\ln\left(\frac{1}{1 - Q(t)}\right)\right) = \beta\ln(t) - \beta\ln(\eta)$$

Next, by setting $$y = \ln\left(\ln\left(\frac{1}{1 - Q(t)}\right)\right) \text{ and} \quad \text{equation (2)}$$

$$x = \ln(t)$$

the equation can be rewritten as $$y = \beta x - \beta \ln(\eta) \quad \text{equation (3)}$$

with an intercept of $$b = -\beta \ln(\eta) \quad \text{equation (4)}$$

With a population of data access patterns, a Weibull plot may be drawn using equations (2) and (3) above. A regression or fit analysis can be performed to linearize the plot. The slope of the resulting line $m=\beta$ is the Weibull modulus for the population of access data patterns.

A hazard function, such as a Weibull hazard function, at any point of time is a ratio of the probability density function to the survival function $(1-F(t))$.

Using the PDF and CDF functions described above and using a standard Weibull distribution (e.g., $\eta=1$), the Weibull hazard function can be represented as follows:

$$H(t) = \frac{f(t)}{1-F(t)} = \beta(t)^{(\beta-1)}$$

The value of $H(t)$ has a marked effect on the failure rate of the Weibull distribution and inferences can be drawn about a population's failure characteristics by considering whether the value of $H(t)$ is less than, equal to, or greater than one.

Weibull distributions with $H(t)<1$ have a failure rate that decreases with time. These failures are also known as infantile or early-life failures. In many applications, including restore operations of Virtual Machines (VM), the access or read pattern is random during the initial stage of restore operation. This occurs, in part, because the restore operation typically reads from the end of a file in order to boot up a VM. The restore or access pattern gradually stabilizes to be sequential over the course of a restore operation. Weibull distributions with $H(t)<1$ would be an ideal representation to model for these early random read failures. Consequently, a read-ahead cache would be disabled initially for these kinds of restore access patterns $(H(t)<1)$. The read-ahead cache would gradually be enabled when restore or access patterns stabilizes to be sequential $(H(t)=1)$.

Weibull distributions with $H(t)$ close to or equal to 1 have a constant failure rate and this is indicative of useful life or random failures. These kinds of distributions normally indicate a constant sequential read pattern, with occasional random reads. The failure rate/random reads are usually constant enough to not affect read-ahead caching. Restore access patterns with $H(t)$ close to or equal to 1, would be a choice to enable read-ahead caching for the lifetime of the restore operation.

Weibull distributions with $H(t)>1$ have a failure rate that increases with time. This is an example of wear-out failures. Applying this to a restore domain in a computing environment, this indicates random restore access patterns during the duration of the restore operation. This indicates that performing read-ahead caching is very ineffective. In this case, read-ahead caching would be turned off or disabled.

Thus:

$H(t)<0$—This suggests or indicates early random reads with later sequential reads. Read-ahead caching is gradually enabled as time progresses.

$H(t)=1$: —This suggests or indicates stable sequential reads, with occasional random reads. Read-ahead caching should be enabled for the restore operation and/or for the duration of the restore operation.

$H(t)>1$—This suggests that random reads are increasing over time or suggests purely random reads. Read-ahead caching should be disable.

Together, these three sections may illustrate an example of a bathtub curve. A mixed Weibull distribution with one subpopulation (early random reads) where $H(t)<1$, one subpopulation (constant sequential reads where $H(t)=1$ and one subpopulation (mostly/purely random reads) where $H(t)>1$ with $H(t)>1$, would have a failure rate plot that was identical to or similar to the bathtub curve.

Figure 2:
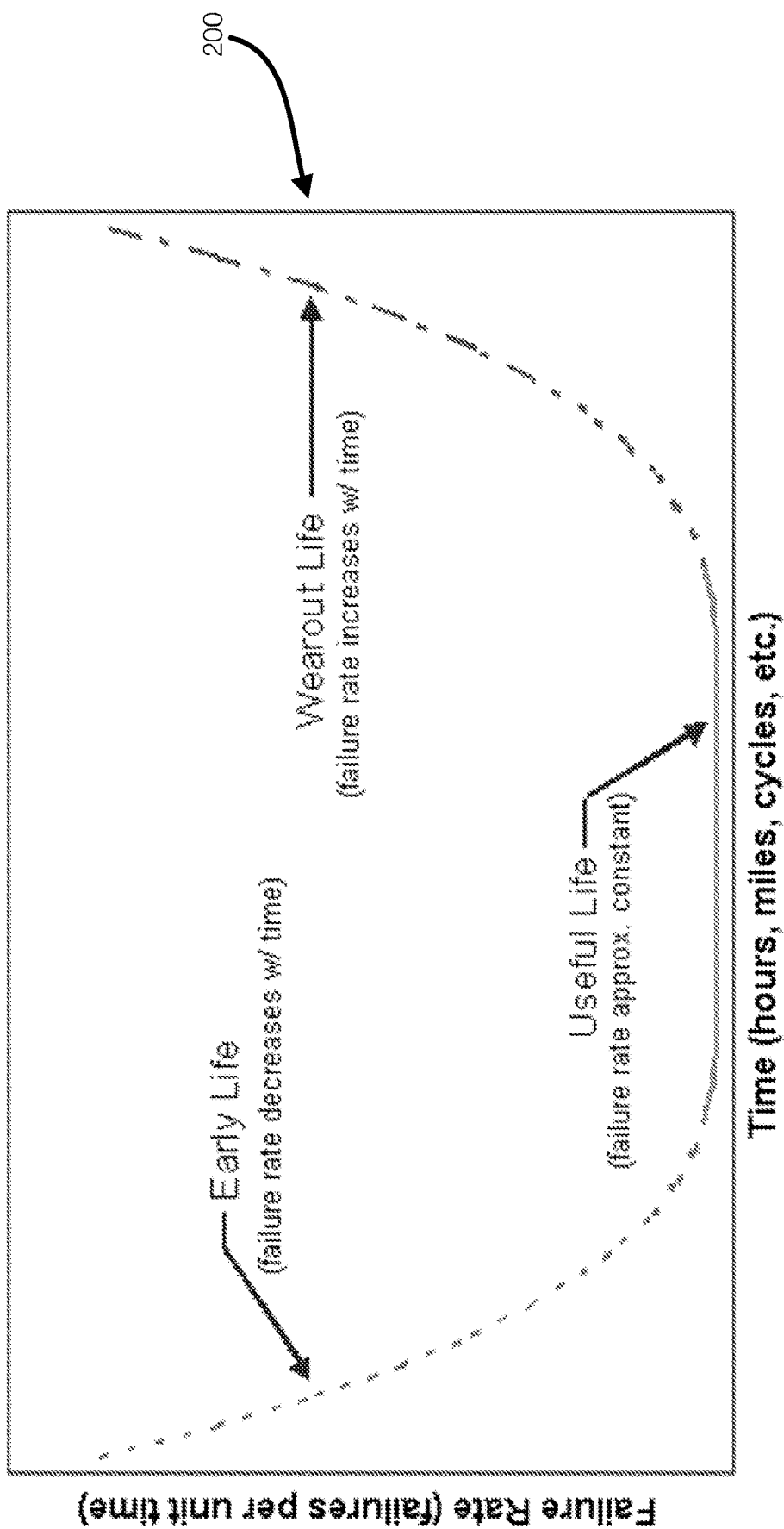
FIG. 2 discloses aspects of failures and the relationship of failures to a hazard function.

FIG. 2 illustrates an example of a bathtub curve. The curve 200 illustrates the relationship between the hazard function $H(t)$ and a failure rate or, in this example, non-sequential read access patterns.

More specifically, random reads are viewed as a failure and this allows the hazard function to be used to determine when to enable or disable read-ahead caching. As the failure rate, as reflected in the hazard function, approaches one, read-ahead caching may be gradually enabled. As the failure rate moves away from 1, read-ahead caching may be gradually disabled.

More generally, the read patterns of a restore operations may vary. The hazard function may be used to enable/disable read-ahead caching. This may result in a restore operation where read-ahead caching is enabled/disabled multiple times.

The following example shown in FIGS. 3-5B illustrates an example of using a Weibull hazard function to control (e.g., enable/disable) read-ahead caching in populations that may be related. In this example and in the context of a Weibull analysis, a non-sequential read is considered to be a failure and a sequential read is considered to be a success. More specifically, FIG. 3 discloses a table 300 of nonsequential reads that occurs during a 12 second interval of restore operation. Table 300 illustrates the number of non-sequential reads or failures that occurs during each second.

In this example, table 300 is divided into two populations (or subpopulations): population 302 and population 304. The population 302 relates to seconds 1-6 and the population 304 relates to seconds 7-12.

The Weibull hazard function is determined for each of the populations 302 and 304. The Weibull probability plot is a plot where the Y axis is the CDF in percentage and the X axis is time in seconds. If the dataset is a Weibull distribution, then the points may be arranged, essentially, in a straight line. A least-square fit of the line give a shape and scale parameter of the Weibull distribution considering the location parameter to be 0.

The Weibull hazard plot is a plot where the Y axis is the hazard function $H(t)$ and the X axis is time in seconds. The Weibull hazard plot can be plotted using the Weibull hazard function $H(t)$.

However, by calculating the logarithmic values and plotting $\text{Ln}(H(t))$ versus $\text{Ln}(t)$, a linear like plot can be obtained. This allows a suitable value or estimate for the value of the shape parameter $\beta$ as the value of the shape parameter is the slope of that plot.

Figure 3:
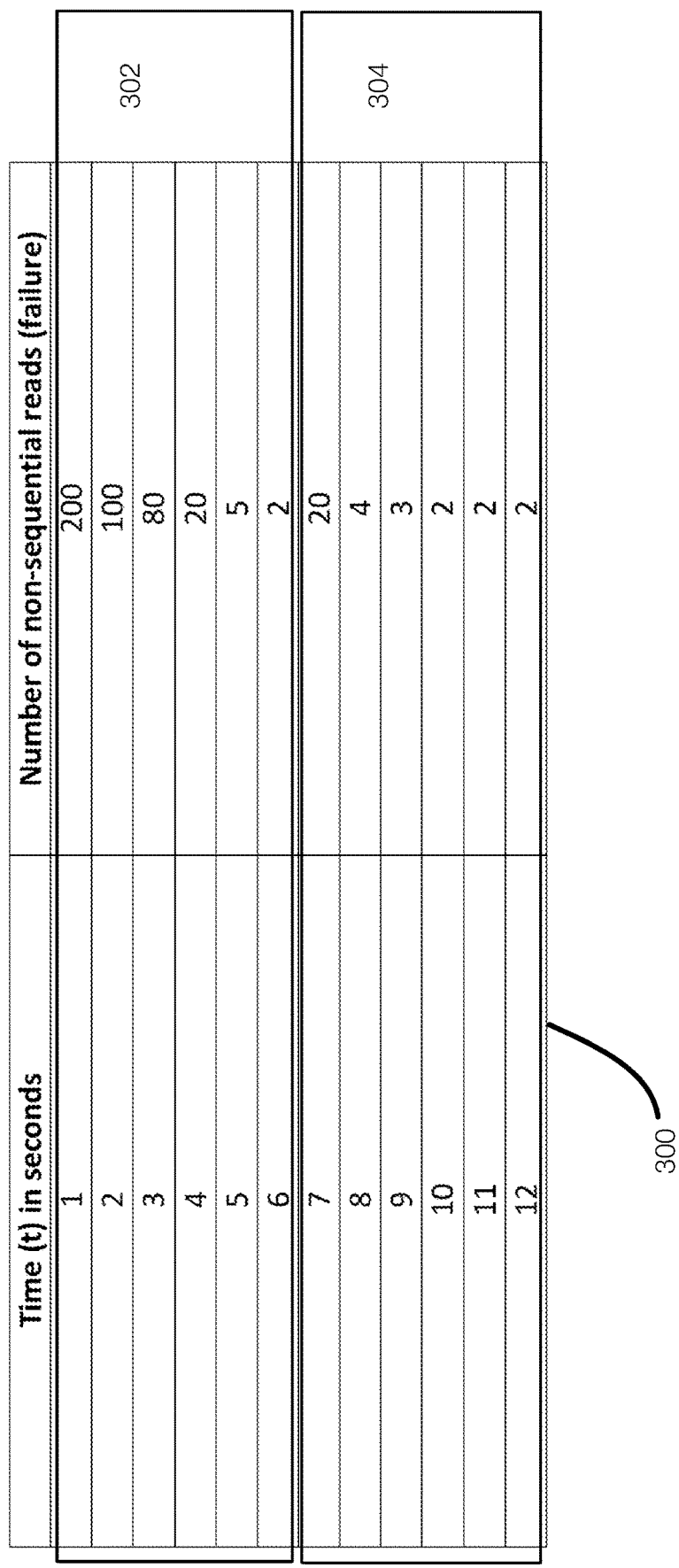
FIG. 3 discloses aspects of nonsequential reads or failures that occur during a time interval.
Figure 4A:
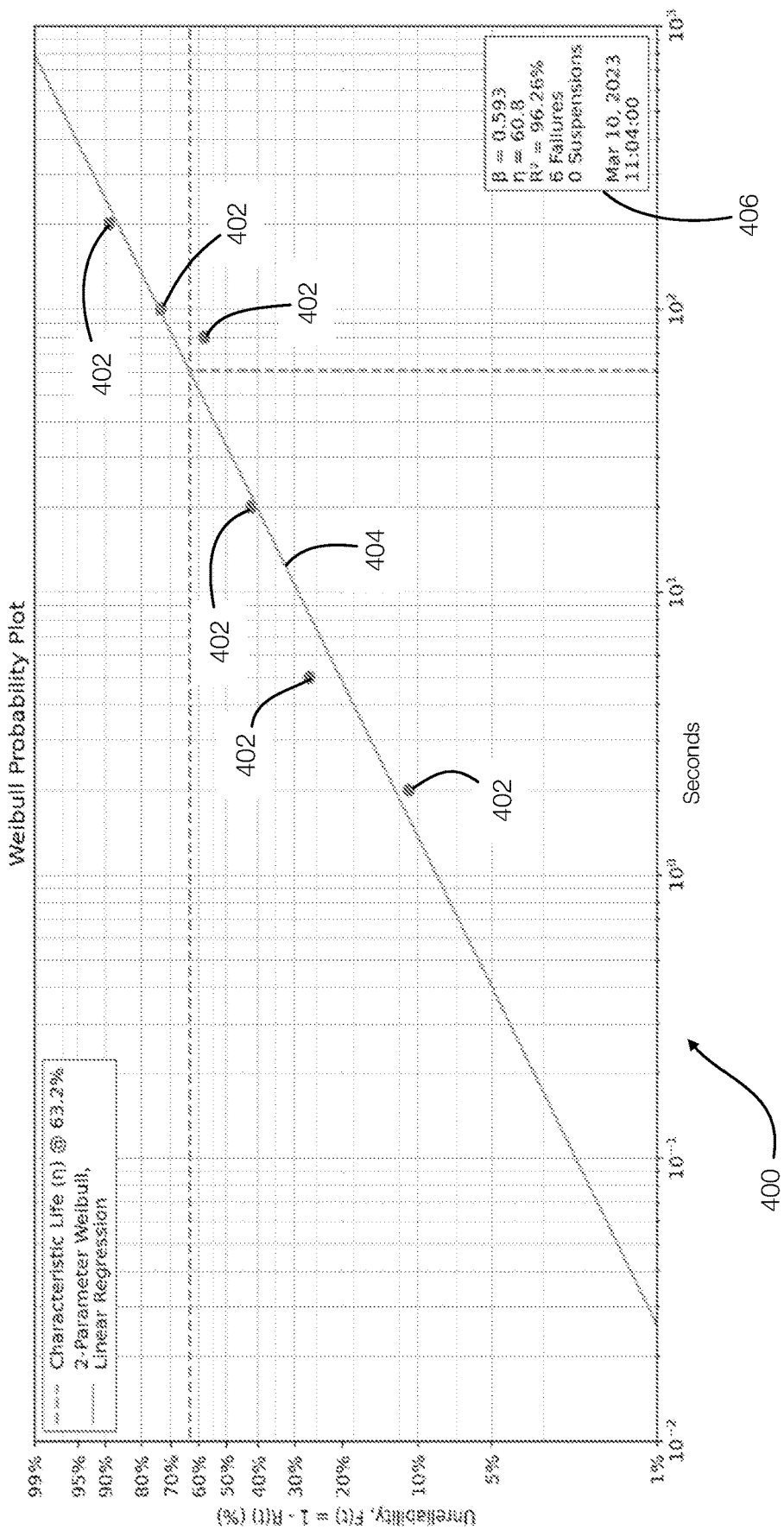
FIG. 4A discloses aspects of a Weibull probability plot.

FIG. 4A illustrates an example of a Weibull probability plot. More specifically, FIG. 4A illustrates a Weibull probability plot 400 for the subpopulation 302 in FIG. 3. Plot 400 is a plot of the CDF vs. time. The points 402 in plot 400 correspond to the data from the subpopulation 302. Line 404 represents a best fit to the data points or, more specifically, a 2-parameter linear regression. In this example, the scale parameter $\eta$ is 60.8 and the shape parameter or slope $\beta$ is 0.593 as illustrated in the data 406.

Figure 4B:
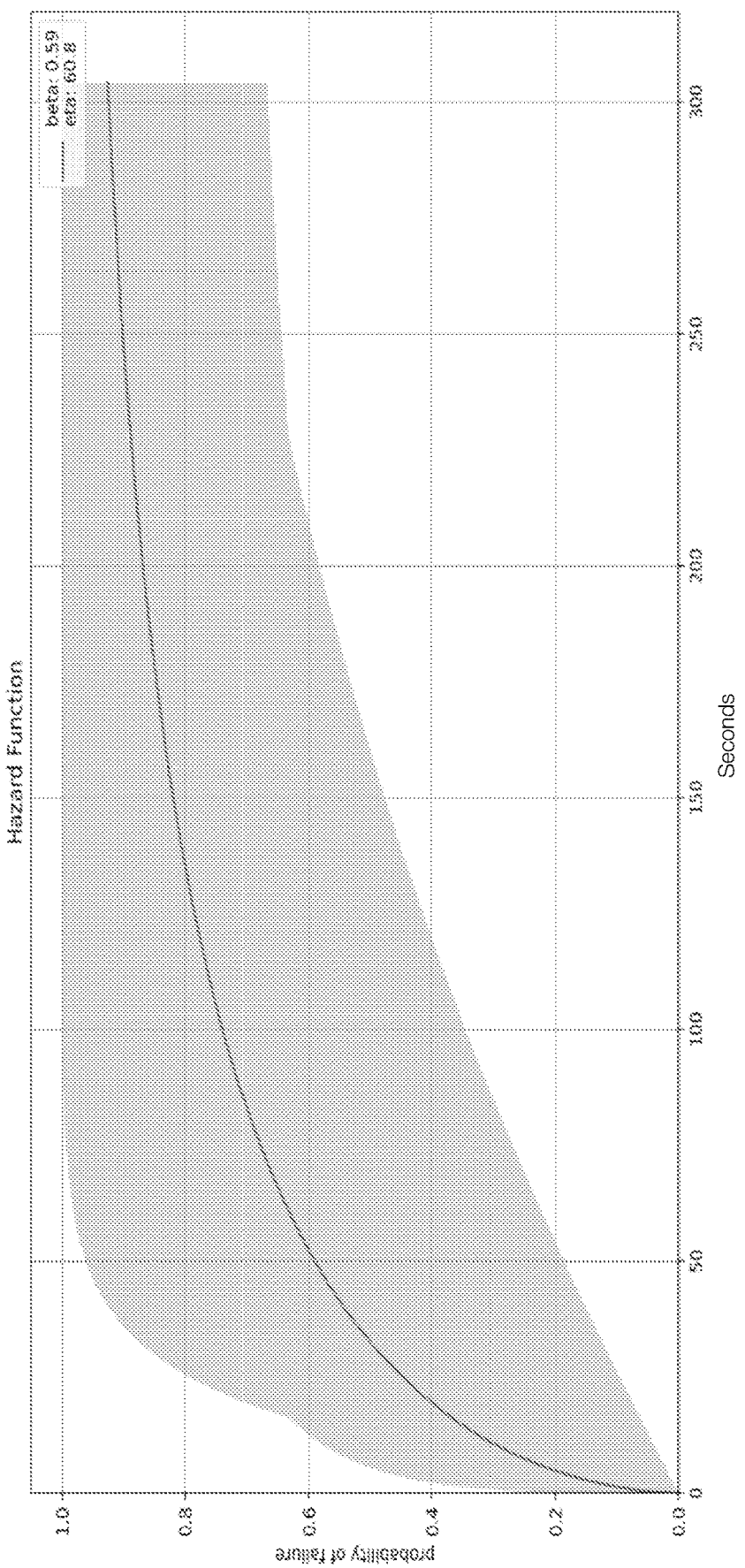
FIG. 4B discloses aspects of a Hazard plot for a subpopulation.

FIG. 4B discloses aspects of a Hazard plot for a subpopulation. More specifically, FIG. 4B illustrates a Weibull hazard plot 450 for the subpopulation 302 in FIG. 3. Plot 450 plots the Weibull hazard function vs. time. As illustrated for the time between 1 to 6 seconds, the Weibull Hazard function is less than 1. Thus, the probability of failure is high and increasing for this subpopulation. FIG. 4B thus illustrates that for the subpopulation 302, read-ahead caching should be disabled.

Figure 5A:
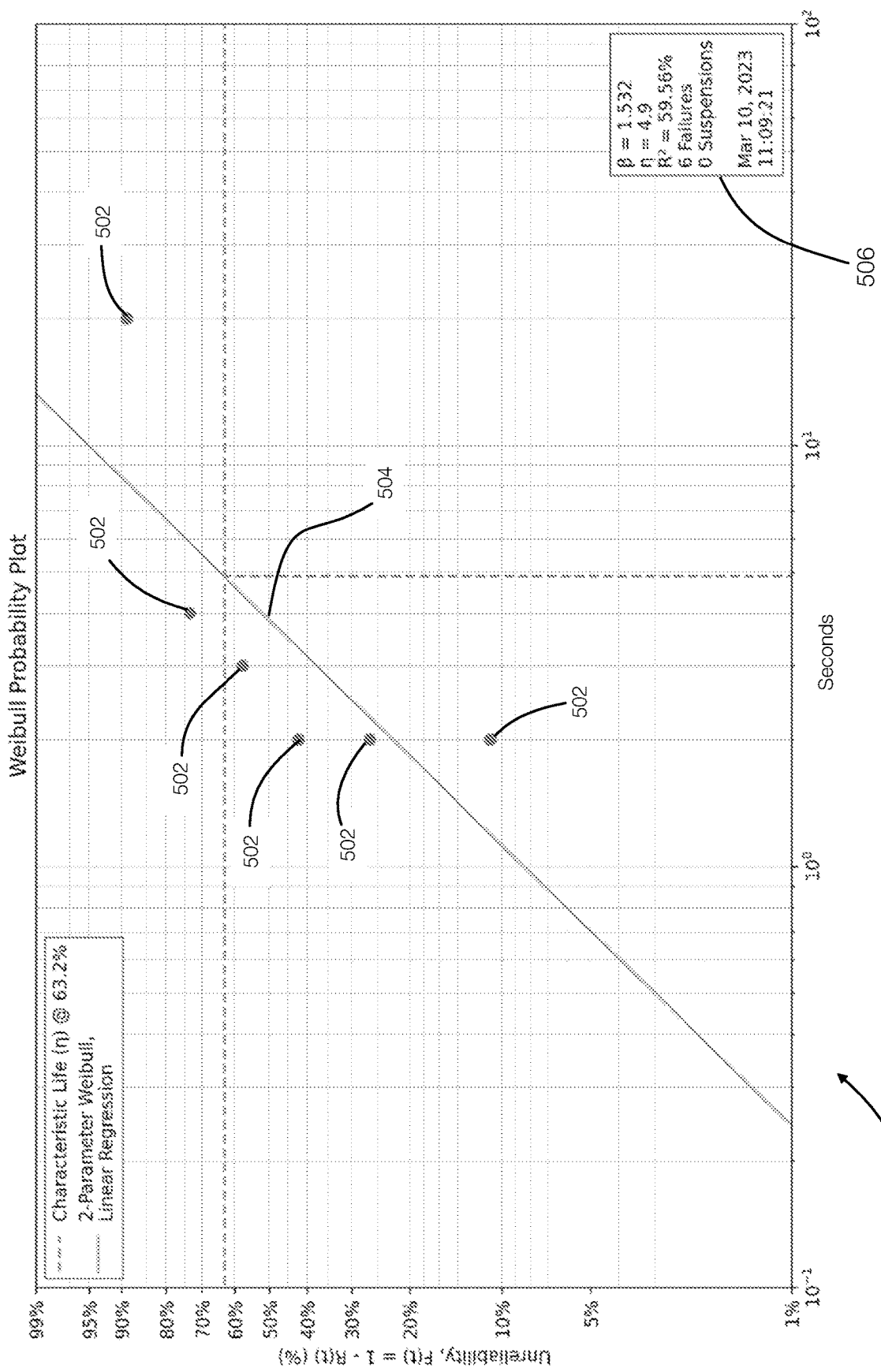
FIG. 5A discloses aspects of another Weibull probability plot.

FIG. 5A illustrates an example of a Weibull probability plot. More specifically, FIG. 5A illustrates a Weibull probability plot 500 for the subpopulation 304 in FIG. 3. The plot 500 is a plot of the CDF vs. time. The points 502 in the plot 500 correspond to the data from the subpopulation 304. Line 504 represents a best fit to the data points or, more specifically, a 2-parameter linear regression. In this example, the scale parameter η is 4.9 and the shape parameter or slope β is 1.532 as illustrated in the data 506.

Figure 5B:
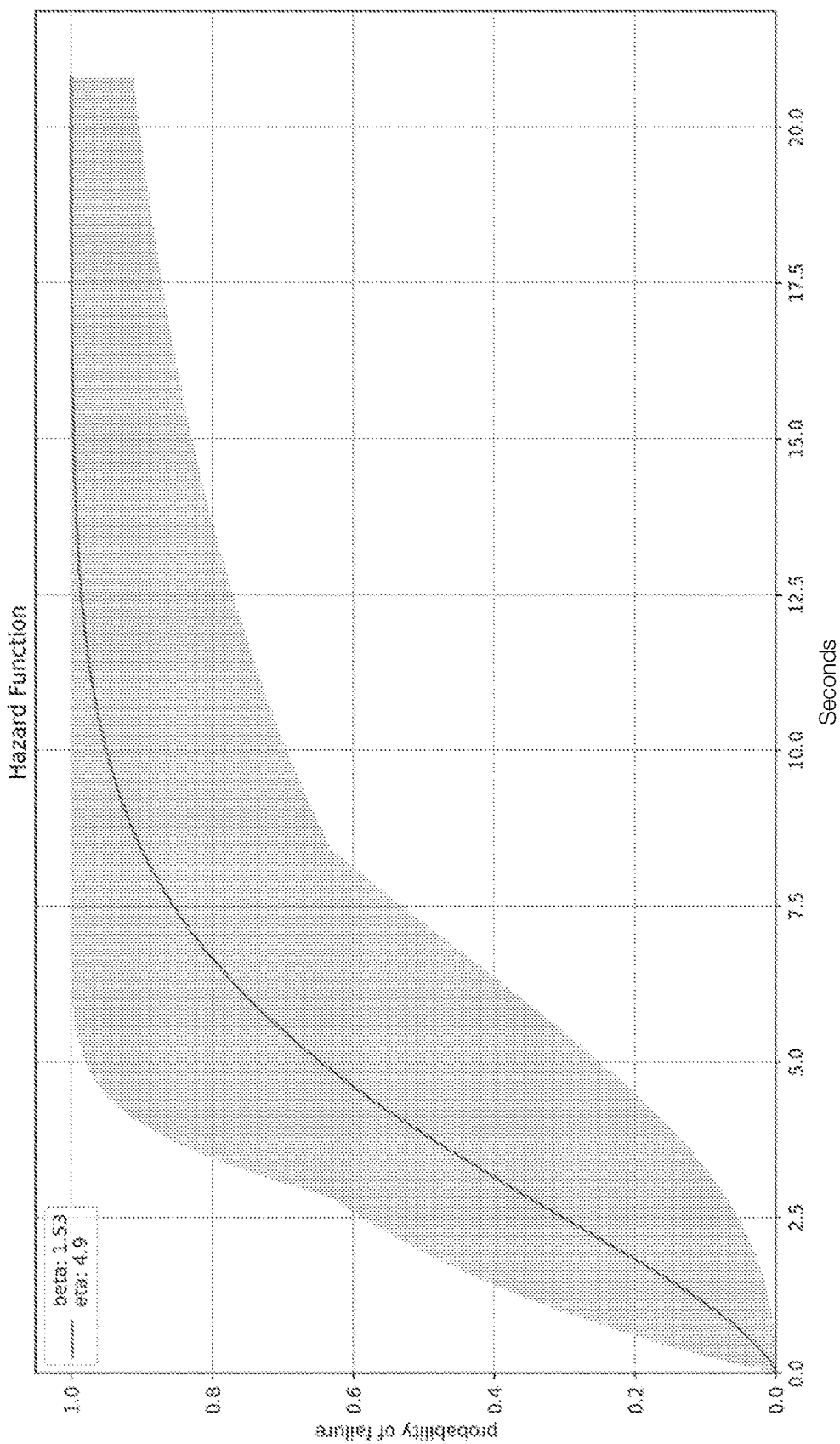
FIG. 5B discloses aspects of another Hazard plot for a subpopulation.

FIG. 5B discloses aspects of a Hazard plot for a subpopulation. More specifically, FIG. 5B illustrates a Weibull hazard plot 550 for the subpopulation 304 in FIG. 3. Plot 550 plots the Weibull hazard function vs. time. As illustrated for the time between 7 to 12 seconds, the Weibull Hazard function is nearing 1. This suggests that the probability of failure has stabilized or is beginning to stabilize. As a result, read-ahead caching should be enabled for the subpopulation 304.

In sum, the examples illustrated in FIGS. 3-5B illustrates that read-ahead caching should be disabled for the first 6 seconds and enabled (or gradually enabled) as the hazard function H(t) gets close to 1. Stated differently, read-ahead caching is enabled or gradually enabled as the read operations of the restore operation are stabilized as sequential read operations or sequential restores.

Figure 6:
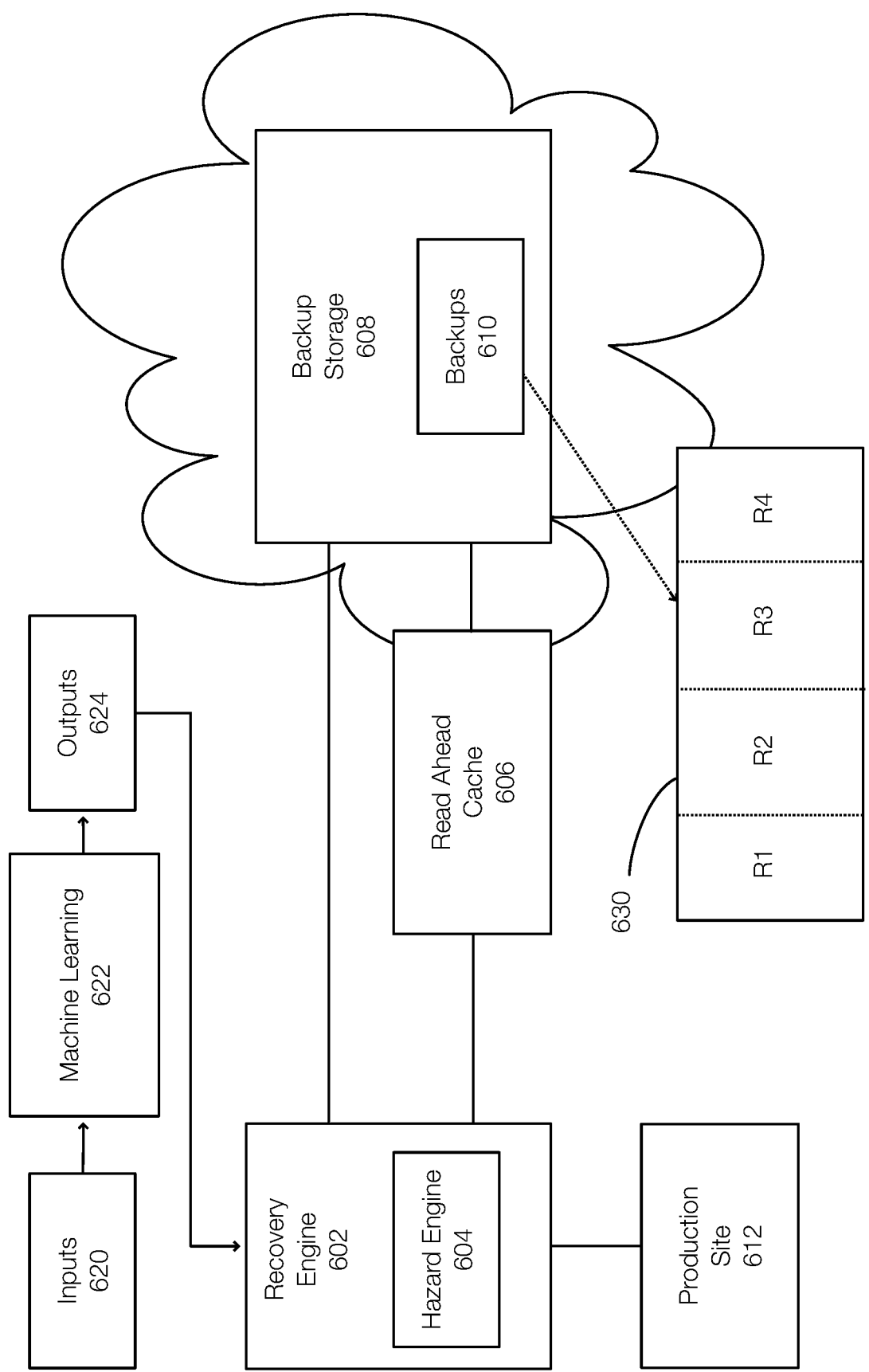
FIG. 6 illustrates a computing environment in which a data protection operation may be performed, which may include determining a hazard value or hazard function for a restore operation that is used to control a state of a read ahead cache.

FIG. 6 illustrates a computing environment in which a data protection operation may be performed, which may include determining a hazard value or hazard function for a restore operation that is used to control a state of a read ahead cache. FIG. 6 illustrates a recovery engine 604 (an example of a data protection system or portion thereof) that includes or is associated with a hazard engine 604. The recovery engine 602 may perform a data protection operation such as a recovery operation. The recovery operation may recover a backup 630 from backups 610 stored in backup storage 608 (e.g., the cloud or a datacenter). The recovery engine 602 may recover the backup 630 to a production site 612.

The organization and relationships of the recovery engine 602, the backup storage 608, and the production site 612 may vary. For example, the recovery engine 602 may be a physical or virtual server or appliance, located on site, in the cloud, or the like, or combination thereof. The production site 612 may be an on-premise site, a cloud based site, or the like. The backup storage 608 is typically cloud based storage and may be associated with a client or other server that is configured to cooperate with the recovery engine 602 to perform data protection operations such as a recovery operation. For example, both the production site 612 and the backup storage 608 may be associated with a recovery engine.

Thus, the data protection operation may be cloud to cloud, intra-cloud, cloud to on-premise, or the like.

In this example, the hazard engine 604 is configured to determine and/or monitor a hazard function for the recovery operation and enable or disable the read ahead cache 606 accordingly. The hazard engine 604 may perform this operation based on an analysis of historical restore access patterns for the present recovery operation and/or previously performed recovery operations. The hazard engine 604 may also use a history of most recent reads, which is an example of a subpopulation.

More specifically, the recovery engine 602 may be recovering the backup 630, which may be one of the backups 610 and may correspond to a selected point in time. The backup, which corresponds to or is stored on a memory that is accessed by the recovery engine 902, may be divided into regions (R1, R2, R3, and R4). Access patterns, or a hazard value, may be determined with respect to the regions individually and/or collectively with respect to subpopulations of these regions. The access patterns are determined to be sequential or non-sequential. The sizes of the regions may be fixed or dynamically set based on offsets.

When determining the access pattern, the recovery engine 602 may keep track of the previous N historical IOs (Input/Outputs). The value of N can be selected by a user or by default. Alternatively, the value of N may be tuned using machine learning methods or based on historical restore operations.

As previously discussed, embodiments of the invention may use a subpopulation of accesses (IOs). In this example, the subpopulation is for the most recent N accesses. Alternatively, the subpopulation is for accesses occurring within a time window (e.g., last 6 seconds).

Figure 7:
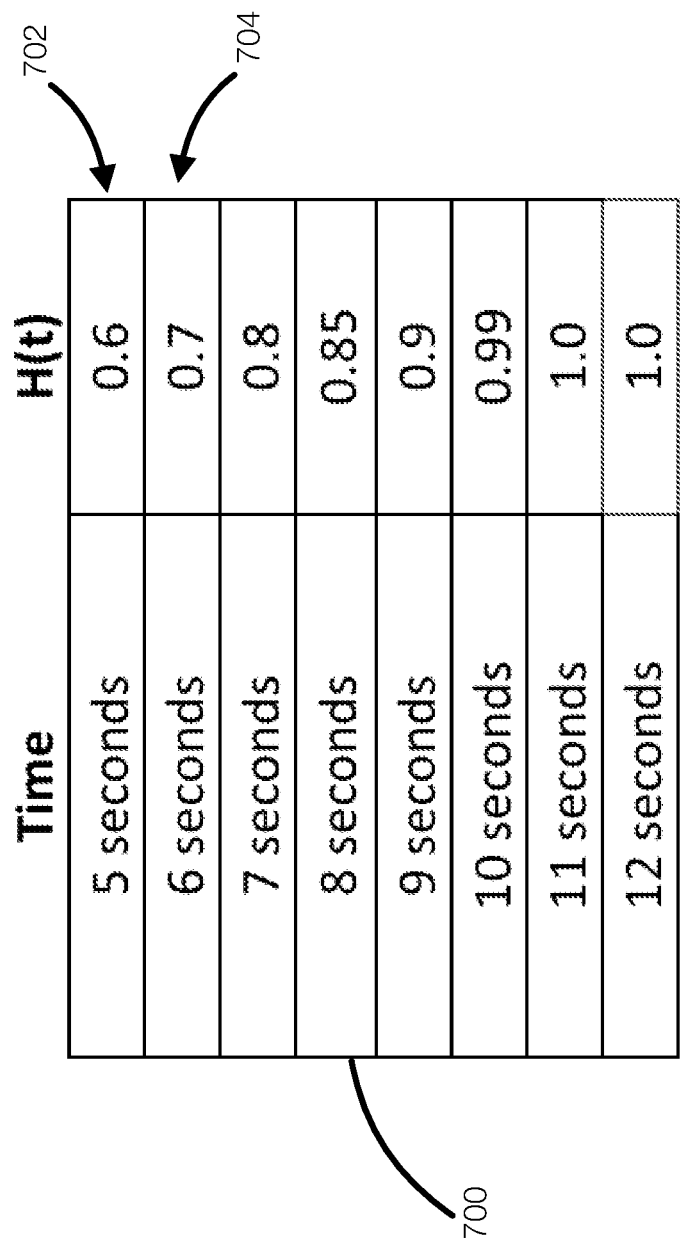
FIG. 7 discloses aspects of changes to a hazard function value over time.

FIG. 7 illustrates a table of hazard function values at different times of a restore operation. The table 700 illustrates values of the hazard function (H(t)) at different times. For example, at 5 seconds, H(t)=0.5. As illustrated in the table 700, the value of H(t) is approaching 1.

More generally, the table 700 that the H(t) can be evaluated at every read or at a different interval. Thus, the population or subpopulation associated with the value of H(t) 702 may include IOs for the previous second. The population or subpopulation associated with the value of H(t) 704 may be IOs for the second.

In some examples, the subpopulations overlap. For example, the value of H(t) for a first population may correspond to seconds 1-6. The value of H(t) for a second population may correspond to seconds 2-7. In this example, the subpopulations for each value of H(t) in the table overlap in some manner. The amount of overlap may vary.

Alternatively, the population or subpopulation of IOs associated with the value of H(t) may not overlap. Thus, the value of H(t) for the first population may correspond to seconds 1-6 and the value of H(t) for a second population may correspond to seconds 7-12. In this example, the subpopulations for each value of H(t) in the table do not overlap.

Returning to FIG. 6, the hazard engine 604 may generate a value of the hazard function for 10 subpopulations, which may be identified based on time. The recovery engine 602 may then use the output of the hazard engine 604 to enable or disable the read ahead cache 606. In one example, the read ahead cache 606 is enabled as the value of H(t) approaches 1. However, a threshold value may be determined. For example, a threshold value of 0.8 may be set. When the value of H(t) exceeds the threshold value, the read ahead cache 606 is enabled. If the value of H(t) is below the threshold value, the read ahead cache 606 is disabled. A value of H(t) equal to the threshold value can be associated with either of enabling or disabling the read ahead cache 606.

This demonstrates that the value of H(t), as described herein, allows the access pattern to be deemed as random or sequential. The read ahead cache 606 is enabled when the access pattern is sequential and disabled when the access pattern is random or not sequential.

When determining the access pattern, a history of IOs (input/outputs or reads in the context of a restore operation) may be maintained for the backup 630 as a whole and/or for each region. The history of IOs allows the various access patterns to be determined as sequential or non-sequential. Whether an access is sequential with respect to a previous access may be determined according to offset. For example, an access may still be sequential if within a threshold distance (e.g., in terms of offset) from a previous access. Thus, the access pattern can be based on the number of successes (sequential data accesses) and failures (non-sequential data accesses) within a history of data accesses. This allows the access to be deemed a success or a failure.

More specifically, with reference to FIG. 3, each subpopulation (e.g., each 6 seconds in this example) is associated with a number of non-sequential reads or failures for each second. The history of IOs allows the recovery engine 602 (or the hazard engine 604) to determine the number of failures that occurred during each second and allows a value of H(t) to be generated. Comparing the output of the hazard engine 604 with a threshold value allows the read ahead cache 606 to be enabled/disabled.

More generally, the data access pattern may be determined based on a larger history of IOs. In one example, the number of failures (non-sequential accesses) may be determined per unit time. These failures can be processed as previously described to determine a modulus and/or hazard value and the read ahead cache is enabled/disabled accordingly. The modulus or hazard function may be updated over time or as new access pattern data is generated during the recovery operation.

Thus, as the recovery engine 602 performs a recovery operation, the hazard engine 604 (or the recovery engine 602) may store a history of IOs and determine the number of failures for a subpopulation (or each time interval in the subpopulation). As new history is generated, the hazard function can be redetermined from the most recent subpopulation. By dynamically generating the hazard function with recent data, the hazard engine 604 can determine whether the current restore access pattern is likely to be sequential or non-sequential. Further, the hazard function allows the determination to be performed in substantially real time.

In addition, machine learning 622 may be employed. Inputs 620 to the machine learning 622 may include historical populations of access patterns or historical failures/successes. The historical data may thus be used to train the machine learning 622 and the trained model, which may incorporate or reflect a hazard function, can be used based on current data. The output 624 thus predict access patterns. This may be combined with the determination of the hazard function. For example, the outputs 624 can be used in conjunction with the hazard value to make a decision regarding whether to enable/disable the read ahead cache. This may allow, for example, the read ahead cache to be enabled earlier or later than the using the hazard value alone or the outputs 624 alone may suggest and further optimize the restore operation.

Figure 8:
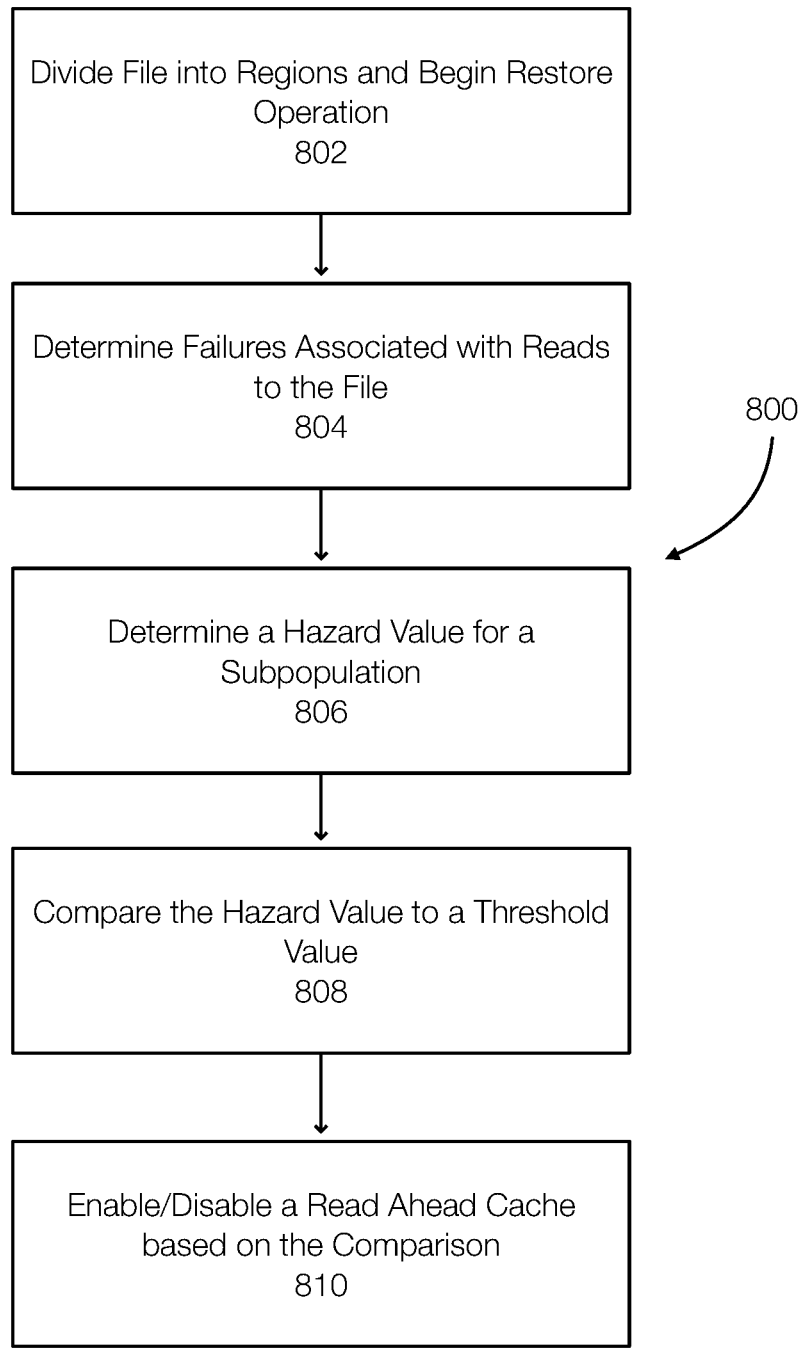
FIG. 8 discloses aspects of performing a restore operation and or enabling/disabling a read ahead cache.

FIG. 8 discloses aspects of performing a restore operation and more particularly of enabling/disabling a read ahead cache. Some aspects of the method 800 may be performed once while other aspects or elements may be performed repeatedly.

The method 800 may identify a file (e.g., a backup to be restored) to recover to a production system and may optionally divide 802 the file into regions. Regardless, a restore operation is initiated.

As the file (or region) is accessed (e.g., read), a history of IOs may be maintained and the accesses may each be deemed a failure or a success. For a given subpopulation (e.g., corresponding to a period of time and/or to a number of prior accesses) the failures associated with reading the file are determined 804. The failures for the subpopulation allow a hazard value to be determined 806.

The hazard value 806 is compared 808 to a threshold value and a read ahead cache is enabled/disabled 810 based on the comparison. Generally, the read ahead cache is enabled when the hazard value is above the threshold value and disabled when the hazard value is below the threshold value.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. Also, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, restore operations, sequential/non-sequential determination operations, modulus operations, cache enabling/disabling operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in anyway.

Embodiment 1. A method, comprising: obtaining a data set that associates a number of failures with a time period for a recovery operation being performed using a file, determining a hazard function value for the data set, wherein the data set corresponds to a subpopulation of accesses to the file during the recovery operation, enabling or disabling a read ahead cache based on the hazard value, and caching data from the file in the read ahead cache when the read ahead cache is enabled.

Embodiment 2. The method of embodiment 1, further comprising dividing the file into regions.

Embodiment 3. The method of embodiment 1 and/or 2, further comprising determining a second hazard value for a second data set associated with a second population of accesses.

Embodiment 4. The method of embodiment 1, 2, and/or 3, further comprising enabling or disabling the read ahead cache based on the second hazard value.

Embodiment 5. The method of embodiment 1, 2, 3, and/or 4, further comprising enabling or disabling the read ahead cache by comparing the hazard value to a threshold value.

Embodiment 6. The method of embodiment 1, 2, 3, 4, and/or 5, wherein the threshold value is 0.8 or greater.

Embodiment 7. The method of embodiment 1, 2, 3, 4, 5, and/or 6, wherein the accesses are stabilized or sequential when the hazard value is 1 or close to 1.

Embodiment 8. The method of embodiment 1, 2, 3, 4, 5, 6, and/or 7, further comprising determining a second hazard value for a second data set associated with a second subpopulation of accesses, wherein the second subpopulation overlaps the first subpopulation.

Embodiment 9. The method of embodiment 1, 2, 3, 4, 5, 6, 7, and/or 8, further comprising determining a second hazard value for a second data set associated with a second subpopulation of accesses, wherein the second subpopulation does not overlap the first subpopulation.

Embodiment 10. The method of embodiment 1, 2, 3, 4, 5, 6, 7, 8, and/or 9, further comprising generating a Weibull probability plot and a Weibull hazard plot and determining the hazard function value from the Weibull probability plot and the Weibull hazard plot.

Embodiment 11. A method for performing any of the operations, methods, or processes, or any portion of any of these or combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. Also, where any of the aforementioned elements comprise or consist of a virtual machine (VM), that VM may constitute a virtualization of any combination of the physical components disclosed herein.

In one example, the physical computing device may include a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. Also, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
obtaining a data set that associates a number of failures with a time period for a recovery operation being performed using a file;

determining a hazard value for the data set, wherein the data set corresponds to a subpopulation of accesses to the file during the recovery operation;

enabling or disabling a read ahead cache based on the hazard value; and caching data from the file in the read ahead cache when the read ahead cache is enabled.

2. The method of claim 1, further comprising dividing the file into regions.

3. The method of claim 1, further comprising determining a second hazard value for a second data set associated with a second population of accesses.

4. The method of claim 3, further comprising enabling or disabling the read ahead cache based on the second hazard value.

5. The method of claim 1, further comprising enabling or disabling the read ahead cache by comparing the hazard value to a threshold value.

6. The method of claim 5, wherein the accesses are random when the hazard value is not approaching 1 or is less than the threshold value.

7. The method of claim 1, wherein the accesses are stabilized or sequential when the hazard value is 1 or greater than a threshold value.

8. The method of claim 1, further comprising determining a second hazard value for a second data set associated with a second subpopulation of accesses, wherein the second subpopulation overlaps the first subpopulation.

9. The method of claim 1, further comprising determining a second hazard value for a second data set associated with a second subpopulation of accesses, wherein the second subpopulation does not overlap the first subpopulation.

10. The method of claim 1, further comprising generating a Weibull probability plot and a Weibull hazard plot and determining the hazard value from the Weibull probability plot and the Weibull hazard plot.

11. A non-transitory storage medium having stored therein instructions that are executable by one or more hardware processors to perform operations comprising:

obtaining a data set that associates a number of failures with a time period for a recovery operation being performed using a file;

determining a hazard value for the data set, wherein the data set corresponds to a subpopulation of accesses to the file during the recovery operation;

enabling or disabling a read ahead cache based on the hazard value; and caching data from the file in the read ahead cache when the read ahead cache is enabled.

12. The non-transitory storage medium of claim 11, further comprising dividing the file into regions.

13. The non-transitory storage medium of claim 11, further comprising determining a second hazard value for a second data set associated with a second population of accesses.

14. The non-transitory storage medium of claim 13, further comprising enabling or disabling the read ahead cache based on the second hazard value.

15. The non-transitory storage medium of claim 11, further comprising enabling or disabling the read ahead cache by comparing the hazard value to a threshold value.

16. The non-transitory storage medium of claim 15, wherein the accesses are random when the hazard value is not approaching 1 or is less than the threshold value.

17. The non-transitory storage medium of claim 11, wherein the accesses are stabilized or sequential when the hazard value is 1 greater than a threshold value.

18. The non-transitory storage medium of claim 11, further comprising determining a second hazard value for a second data set associated with a second subpopulation of accesses, wherein the second subpopulation overlaps the first subpopulation.

19. The non-transitory storage medium of claim 11, further comprising determining a second hazard value for a second data set associated with a second subpopulation of accesses, wherein the second subpopulation does not overlap the first subpopulation.

20. The non-transitory storage medium of claim 11, further comprising generating a Weibull probability plot and a Weibull hazard plot and determining the hazard value from the Weibull probability plot and the Weibull hazard plot.

* * * * *